United States Patent
Poola et al.

(10) Patent No.: US 10,069,900 B2
(45) Date of Patent: Sep. 4, 2018

(54) SYSTEMS AND METHODS FOR ADAPTIVE THRESHOLDING USING MAXIMUM CONCENTRATION INTERVALS

(71) Applicant: Oracle International Corporation, Redwood City, CA (US)

(72) Inventors: Thyagaraju Poola, Sunnyvale, CA (US); Brent Enck, Roseville, CA (US); Vladimir Volchegursky, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 942 days.

(21) Appl. No.: 14/452,283

(22) Filed: Aug. 5, 2014

(65) Prior Publication Data

US 2016/0042289 A1 Feb. 11, 2016

(51) Int. Cl.
G06N 7/02 (2006.01)
H04L 29/08 (2006.01)
G06N 7/00 (2006.01)

(52) U.S. Cl.
CPC .............. *H04L 67/10* (2013.01); *G06N 7/00* (2013.01)

(58) Field of Classification Search
None
See application file for complete search history.

(56) References Cited

U.S. PATENT DOCUMENTS

| 6,597,777 | B1* | 7/2003 | Ho | H04L 41/0896 370/235 |
| 7,672,814 | B1 | 3/2010 | Raanan et al. | |
| 9,141,914 | B2 | 9/2015 | Viswanathan et al. | |
| 9,195,563 | B2 | 11/2015 | Scarpelli | |
| 9,658,910 | B2 | 5/2017 | Poola et al. | |
| 2002/0183972 | A1* | 12/2002 | Enck | G05B 23/0254 702/185 |
| 2010/0324869 | A1* | 12/2010 | Cherkasova | G06F 11/3409 703/2 |
| 2014/0325649 | A1* | 10/2014 | Zhang | H04L 43/024 726/23 |
| 2016/0034328 | A1* | 2/2016 | Poola | G06F 11/0748 714/37 |
| 2016/0042289 | A1* | 2/2016 | Poola | G06N 7/00 706/52 |
| 2016/0092516 | A1* | 3/2016 | Poola | G06F 17/30377 707/776 |
| 2016/0292611 | A1* | 10/2016 | Boe | H04L 41/5009 |

* cited by examiner

Primary Examiner — Paulinho E Smith
(74) *Attorney, Agent, or Firm* — Invoke

(57) ABSTRACT

Aspects provide a generic and adaptive approach to adaptive thresholding by using a maximum concentration interval of data to determine one or more adaptive thresholds for any type of operational metric. The generated adaptive thresholds and operational metrics may be used to calculate or otherwise perform a statistical analysis that provides a confidence-level for any changes detected in the operational metric behavior.

22 Claims, 6 Drawing Sheets

SYSTEMS AND METHODS FOR ADAPTIVE THRESHOLDING USING MAXIMUM CONCENTRATION INTERVALS

TECHNICAL FIELD

Aspects of the present disclosure relate to systems and methods for analyzing metrics.

BACKGROUND

Operations system monitoring represents a critical component of any large scale software system, including enterprise-level information technology systems. Monitoring the operations of such systems enables administrators to perform various diagnostic procedures, such as for example, determining whether the system is functioning properly and automatically initiating various repair procedures when the system is functioning improperly. The monitoring services and/or applications are complex and typically require the collection of numerous operational metrics, and the continuous aggregation, interpretation, and reporting of the collected operational metric data.

A major challenge in the design and implementation of such monitoring services is ensuring that the operational metrics being collected accurately identify operational issues within the system. Stated differently, the monitored operational metrics must accurately reflect the behaviors of the system and cannot falsely indicate that the system is behaving improperly when the system is actually behaving as intended. Monitoring services that are too sensitive, static and inflexible, and/or improperly configured, cause such errors.

It is with these concepts in mind, among others, that aspects of the present disclosure were conceived.

SUMMARY

Aspects of the present disclosure involve systems, methods, and/or non-transitory computer-readable mediums for performing adaptive thresholding. The methods and/or non-transitory computer readable medium instructions include determining a value range that covers at least a certain percentage of all value occurrences in the first set but does not cover at least one or more value occurrences in the first set, wherein the value range is selected based at least in part on the value range having a shorter length than one or more other possible value ranges that also cover at least the certain percentage of all value occurrences in the first set. The methods and/or non-transitory computer readable mediums further include determining at least a first probability that the value occurrences in the first set are above or below the value range. The methods and/or non-transitory computer readable mediums include, for a second set of values that quantify behavior of the system: determining a number of values in the second set are above or below the value range that was determined for the first set and based at least in part on the number of values and at least the first probability, determining whether the second set of values likely represents a different distribution than the first set of values. The methods and/or non-transitory computer readable mediums further include, in response to determining that the second set of values likely represents a different distribution than the first set of values, storing, by the one or more computing devices, an indication that the second set of values likely represents a different distribution than the first set of values.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
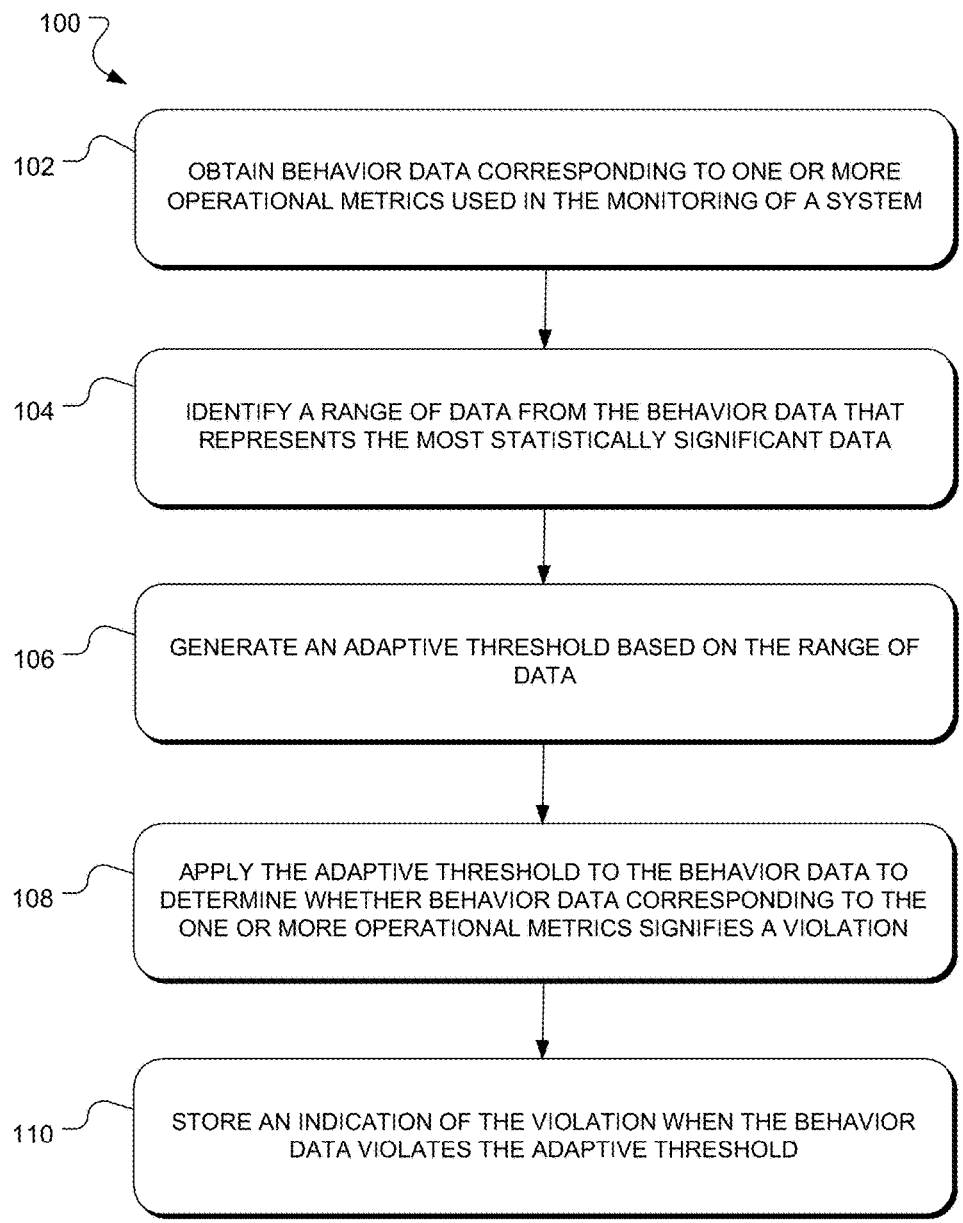
FIG. 1 is a flowchart illustrating an example process for performing adaptive thresholding, according to aspects of the present disclosure.

Aspects of the present disclosure involve systems and/or methods for performing adaptive thresholding during the monitoring of various hardware and/or software systems, such as various middleware systems included within an information technology ("IT") organization. In various aspects, behavior data quantifying the behavior of one or more operational metrics of the monitored system(s) may be gathered, aggregated, and stored (e.g., in a database) over a period of time. Once gathered, the behavior data may be used in an adaptive threshold process to provide various alerts, alarms, and/or other types of reporting, in response to any system issues, improper system behaviors, and/or the like, which may be identified from the behavior data.

Generally speaking, adaptive thresholding involves analyzing behavior data of a system at regular intervals to quantify the system's typical operation. In various aspects, since the behavior data gathered for the various operational metrics is collected over a period of time, in some instances, the behavior data may contain gaps, or large segments in which behavior data corresponding to a given operational metric is missing. To mitigate gaps in the behavior data, a range of data, such as a maximum concentration interval of data ("MCI"), may be selected from the gathered behavior data that represents the maximum concentration of data values that likely represent the most statistically significant portions of the behavior data and which may be useful in the adaptive threshold process. For example, the selected MCI may be used to generate an adaptive threshold for the one or more operational metrics that identifies the point at which normal behavior data of an operational metric may be distinguished from abnormalities, noise, and/or the like. In the specific example of monitoring middleware systems, the adaptive threshold represents the point at which the middleware system is no longer functioning as intended. Stated differently, the adaptive threshold is compared to changes in an operational metric of a middleware system's behavior (e.g., object request time, messaging, data integration) to identify abnormalities.

Typical approaches to establishing adaptive thresholds involve the use of a "fixed value" that is independent of the monitored system behavior and the use of which results in significant false positives. Using fixed, non-adaptive, and pre-set thresholds assumes that the operational values are known in advance, which is typically not the case. Moreover, such "fixed" thresholds are set with operational values that are based on experimental insight gleaned by professionals from working knowledge of their complex middleware systems. Any type of real-time system change weakens such assumptions.

Other methods for establishing an adaptive threshold involve adaptive thresholds that are determined using algorithms that require the use of static data distributions, such as the percentile approach. In the percentile approach, adaptive thresholds are determined based on the "tails" of a distribution of the data. For example, using the five percentile approach, the first five percent from the left of the distribution is considered the left tail and the location of a threshold. Using the $95^{th}$ percentile approach, the first five percent from the right is considered the right tail and the location of a threshold. Under the percentile approach, it is presumed that the left five percent, (i.e., the left tail) and the right five percent, (i.e., the right tail) are of the same significance. The significance of the tails, however, is specific to the nature of the operational metric being monitored. For example, if the operational metric is a "response time" metric, the right tail, which equates to a long response time, is more significant than the left tail, which equates to a quick response time, because a long response time means that the system is taking more time to process requests. As another example, in the case of a "throughput" operational metric, the left tail, which equates to a small amount of throughput is more significant because it indicates that there is less throughput in the system. The percentile approach thus generates false positives because it assumes a symmetrical data distribution and treats each tail equally. While useful for some metrics, the percentile approach is not applicable to all metrics.

Aspects of the present disclosure provide a generic and adaptive approach to adaptive thresholding involving the use of an MCI to determine one or more adaptive thresholds for any type of operational metric. The generated adaptive threshold and operational metrics may be used to calculate or otherwise perform a statistical analysis that provides a confidence-level for any changes detected in operational metric behavior. Such an approach avoids gaps in the behavior data, and does not assume that the data's distribution must conform to any pre-defined set of distribution models, or have some special distribution property such as symmetry, effectively reducing the probability of false positives when used as an alert for adaptive threshold violations.

Figure 2A:
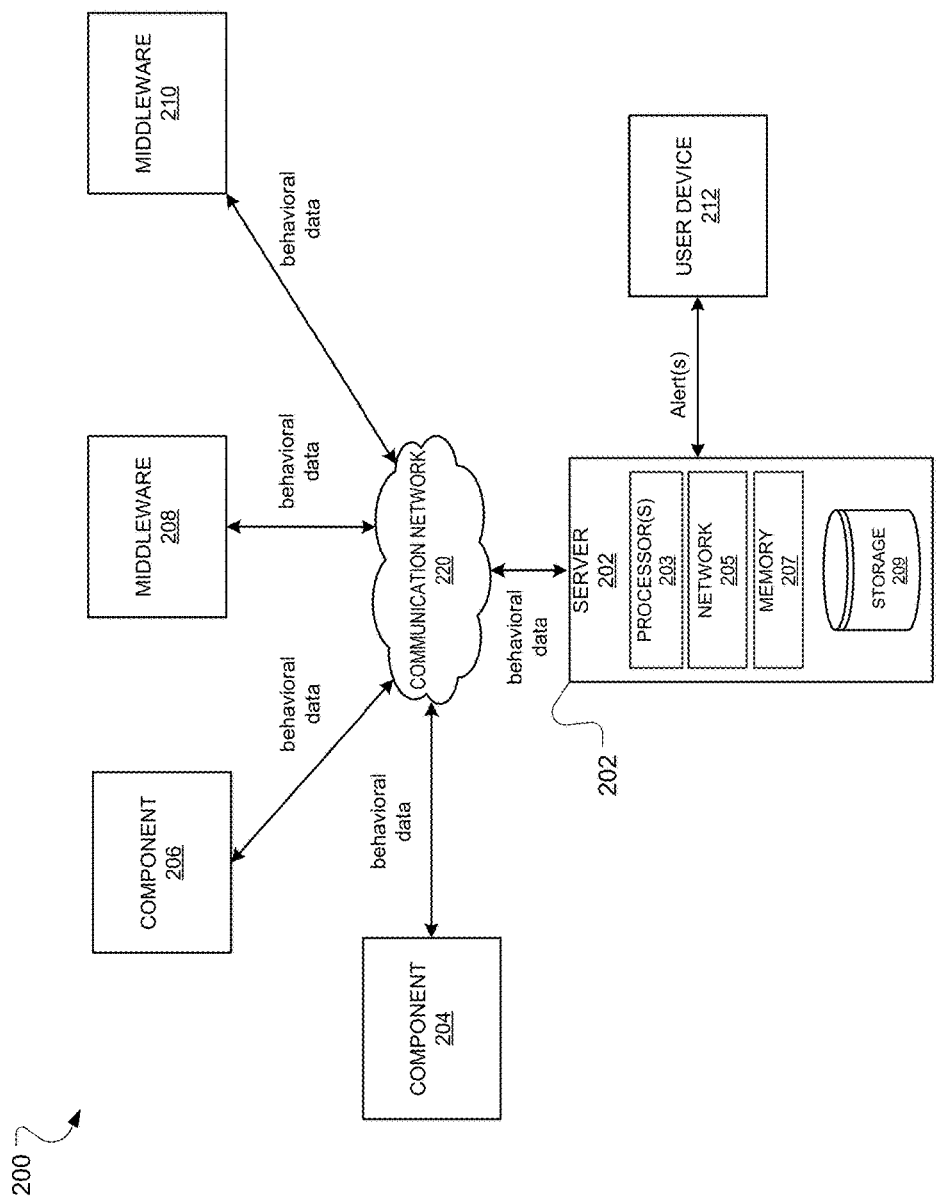
FIGS. 2A-2B are block diagrams illustrating a computing architecture for performing adaptive thresholding, according to aspects of the present disclosure.
Figure 2B:
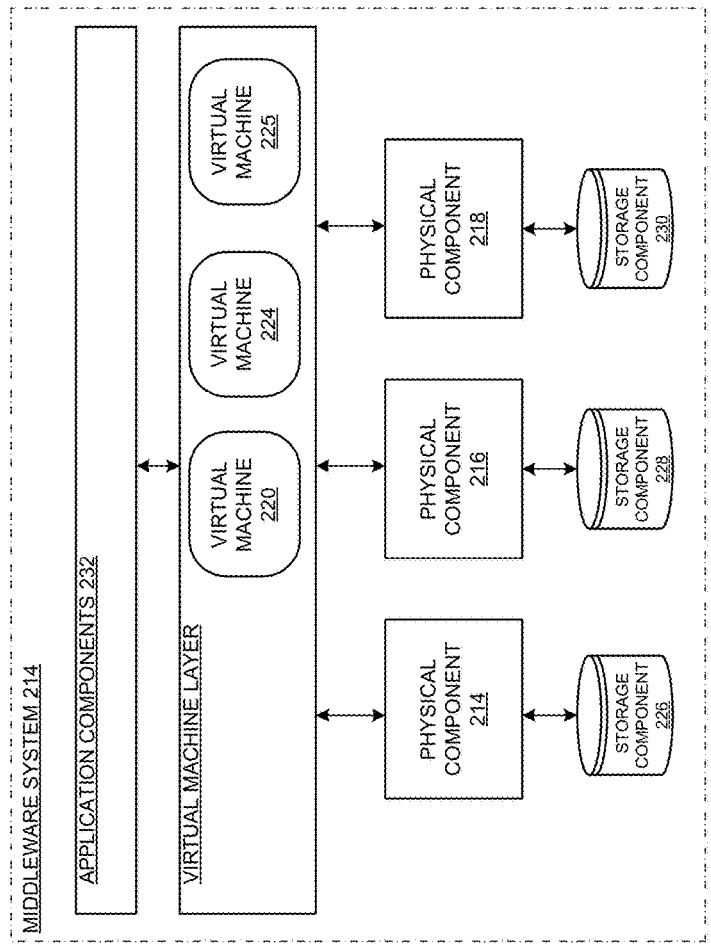

An illustrative process and/or system for performing adaptive thresholding during the monitoring of various hardware and/or software systems is depicted in FIGS. 1 and 2. In particular, FIG. 1 illustrates an example process 100 for identifying a range of data, such as a maximum concentration interval, for use during adaptive thresholding. FIGS. 2A-2B illustrate a computing architecture 200 and a middleware system 214 including hardware and/or software components that may be involved in the execution of the process 100 of FIG. 1.

Referring initially to FIG. 2A, the computing architecture 200 includes a server 202, which may include one or more processors (CPUs) 203, a local memory 207, a storage 209 (e.g., a storage appliance), and various network resources 205, of any suitable type. Although the storage 209 is depicted as being a part of the server 202, it is contemplated that the storage may be located externally or elsewhere, in operable communication with the server 202. The server 202 may interact or otherwise communicate with one or more hardware components and/or middleware systems 204, 206, 208, and 210 capable of generating or otherwise providing behavior data to the server 202. More particularly, the server 202 may monitor various operational metrics to obtain behavioral data to perform adaptive thresholding, and further, may generate an alert when a threshold is met. The alert may be provided to, for example, a user-device 212 accessible by a system administrator. The server 202 may communicate with the computing systems 204, 206, 208, and 210 capable through a communications network 220, which may be the Internet, an intranet, a local area network, a wireless local network, a wide area network, or another communication network, as well as combinations of networks.

According to one embodiment, the one or more hardware components and/or software applications 204, 206, 208, and 210 may be, or otherwise be included in, a middleware system (e.g., 208 and 210), which may be a software and/or hardware that provides services to various components of a distributed system to enable the components to communicate and manage data. Stated differently, middleware systems provide the infrastructure used to integrate existing applications, and systems, and provide services, such as concurrency, transactions, threading, messaging, and/or the like. FIG. 2B illustrates a middleware system 214, according to one embodiment. As illustrated, the middleware system 214 includes one or more physical components 214 and 216 such as a server(s), disk, network gateway, routers, etc. Additionally, the middleware system 214 may include one or more virtual machines 220, 224, and 225, and various storage components 226, 228, and 230, such as databases, storage appliances, disks, and/or the like. The middleware system 214 may further include various logical middleware software components 232 (e.g., a weblogic server cluster) and/or other custom application software (e.g., a J2EE application), web services, and/or the like.

Referring now to FIG. 1, the process 100 for identifying a range of data, such as an MCI, for use in performing adaptive thresholding during the monitoring of various hardware and/or software systems is provided, according to one embodiment. As illustrated, process 100 begins with obtaining behavior data corresponding one or more operational metrics used in the monitoring of a system, such as a middleware system (operation 102). In particular, the server 202 may execute an application, process, thread, instruction and/or the like, to gather or otherwise obtain behavior data from the one or more components of a middleware system and/or middleware systems 204, 206, 208, and 210. For example, behavior data corresponding to various operational metrics of a J2EE application executing in a middleware system (i.e., customer software component) may be obtained. Such operational metrics may include an average response time per interval (ms) metric, a response error count metric, and an invocation count metric. As another example, behavior data corresponding an active requests metric, a requests per second metric, and a pending request current count metric, of an weblogic j2ee server application maintained within a middleware system may be obtained by the server 202. Other operational metrics may include a "response time" metric that describes the amount of time a CPU takes to process a request to execute various instructions and a "throughput" operational metric that quantifies the amount of processing work a component can perform during a given time period. It is contemplated that behavior data corresponding to any monitored operational metric of a middleware system may be obtained.

The obtained behavior data corresponding to a given operational metric may include numerous discrete data values (e.g., tens, hundreds, or thousands) obtained at a pre-configured frequency over a specific period of time, such as for example, every millisecond, second, minute, hour during a day, day during a week, every two days during a month long period, or any other temporal delineation. For example, in one embodiment, the behavior data may be obtained during a "threshold" window, which represents an initial window from which behavior data corresponding to an operational metric is gathered or otherwise obtained. The threshold window is used by the server 202 to generate the initial adaptive thresholds for use in analyzing system behavior. FIG. 3B provides an example illustration of six (6) windows 320, 322, 324, 326, 328, and 330, any of which may be considered a threshold window, and during which behavior data may be obtained for a given operational metric. The x-axis 316 represents each data value included within a given threshold window and the y-axis 318 represents time. The amount of discrete data values included within the behavioral data and obtained during such a window (e.g., a threshold window) may be enough to support any type of statistical significance testing that may be performed. In one particular embodiment, the minimum points included within the threshold window for statistical validity is twenty data values and fifty data values may be optimal. For example, an acceptable threshold window dataset of fifty data value points, observed sequentially in time may include the data values: {70, 75, 80, 70, 75, 80, 83, 86, 83, 86, 88, 130, 97, 108, 75, 80, 75, 88, 121, 143, 70, 75, 80, 70, 75, 80, 83, 86, 83, 86, 88, 130, 97, 108, 75, 80, 143, 108, 112, 115, 130, 70, 80, 86, 97, 112, 75, 83, 88, 97} (the example and dataset is collectively referred to herein as "Example A").

The behavior data obtained during a threshold window by the server 202 may include one or more "gaps," or segments of missing data. For example, gaps may exist because of valid system behavior. For example, in the context of processing requests, some requests may take an interval of 3 milliseconds to 6 milliseconds and other types of requests take more than 15 milliseconds, resulting in gaps between 6 milliseconds to 15 milliseconds. Alternatively, gaps may arise for operational reasons, such as for example, turning off metric behavior data collection for a particular operational metric for a brief period of time.

To reduce the probability that the behavior data includes gaps, a range of behavior data is identified that corresponds to the one or more operational metrics and represents a concentration of data values that are likely statistically significant, or of an acceptable significance level (operation 104). In one embodiment, the server 202 processes the obtained behavior data to identify an MCI as the most statistically significant range of behavior data for use in analyzing system behavior. As described above, an MCI represents the maximum concentration of data values, obtained over the shortest interval of values, for the selected operational metric. Stated differently, the MCI may be defined as the ratio of the number of data point observations to the length of the value range, which illustrates the likelihood for data point observations to belong to the interval.

Initially, to determine the MCI, the behavior data included within the threshold window may be analyzed to determine a probability of each value based on the number of times each value is observed (i.e., the density of each value). More specifically, the data values included within the threshold window may be sorted in increasing order and a Probability Density Function ("PDF") may be calculated based on the ordered dataset of behavior data to determine the probability of each value, according to density. Stated differently, the PDF may Referring to Example A, sorting the data values according to an increasing order results in the following dataset: {70, 75, 80, 83, 86, 88, 97, 108, 112, 115, 121, 130, 143}. The calculated PDF Value for each data value included within dataset is provided in table 1 below.

TABLE 1

Data Values and corresponding PDF Values

| Data Value | PDF Value |
|---|---|
| 70 | 0.1 |
| 75 | 0.16 |
| 80 | 0.14 |
| 83 | 0.1 |
| 86 | 0.1 |
| 88 | 0.08 |
| 97 | 0.08 |
| 108 | 0.06 |
| 112 | 0.04 |
| 115 | 0.02 |
| 121 | 0.02 |
| 130 | 0.06 |
| 143 | 0.04 |

Figure 3A:
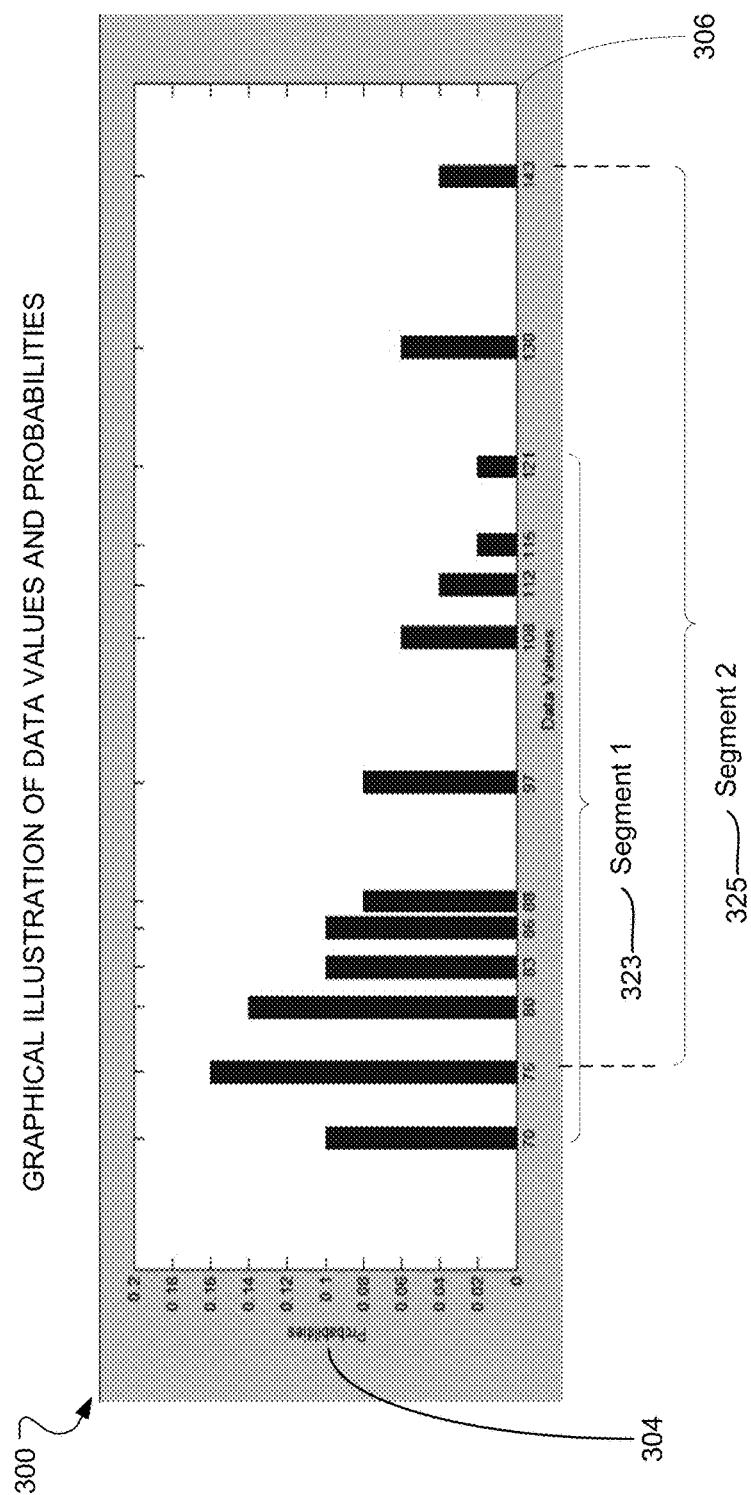
FIGS. 3A is a graphical illustration of data value probability density functions, according to aspects of the present disclosure.
Figure 3B:
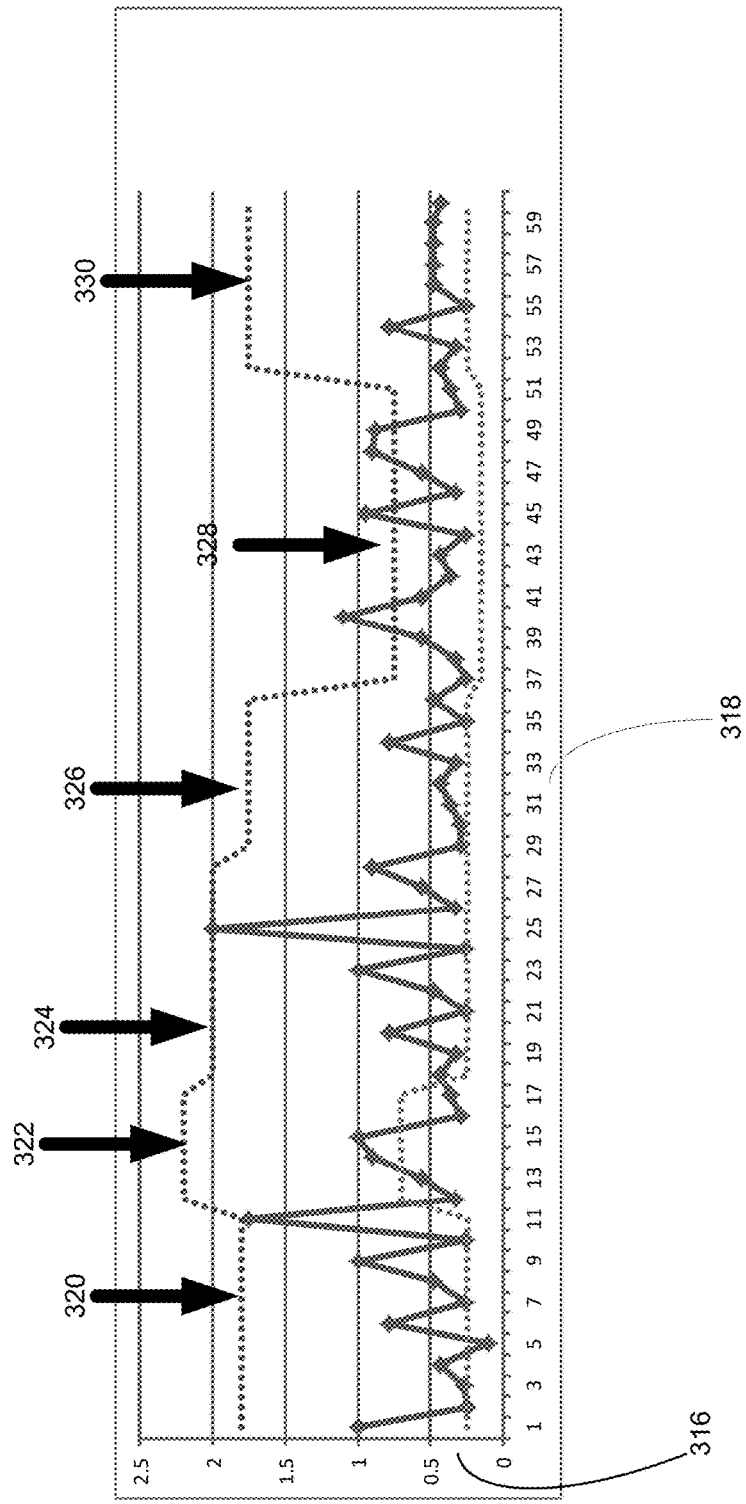
FIG. 3B is an illustration of adaptive threshold data windows, according to aspects of the present disclosure.

FIG. 3A provides a graphical illustration of the identification of a range of data, particularly an MCI, from a larger set of behavior data for a given operational metric, such as an initial threshold window of behavior data. As described above, the MCI is determined by finding the shortest segment (also known as an "interval") in which the concentration of data values is not less than a required density level. The required density level defines the percentage of points that represent the typical system behavior, as quantified and/or represented by the thresholds.

The illustrated embodiment of FIG. 3A provides a histogram 300 of the data values included in the ordered dataset of Example A in Table 1 above. The x-axis 306 represents each data value included within the threshold window sorted by values in increasing order and the y-axis 304 represents each data value's corresponding PDF value. To establish the MCI, a moving window approach is applied, during which a series of segments are initiated or otherwise identified to capture the required density level percentage of all of the behavioral data value points included within a window. Each segment has a specific length, defined along the x-axis 306, including a start (left) point on the x-axis and an end (right) point on the x-axis. Additionally, each segment has a corresponding concentration, which is equivalent to the sum of the probabilities (i.e., PDF values) corresponding to the various data value points between the segment's start and end point.

In the illustrated embodiment of FIG. 3A, the required density level percentage of 90% is applied, although it is contemplated that any percentage of data values may be used. The segment length for a first window is determined by starting at the first point 70 on the x-axis 306 and adding subsequent PDF values that are to the right such that the required density level percentage level is identified. Thus, the first segment 323 includes data values from data value 70 to data value 121 because the sum of the PDF Values: {0.1, 0.16, 0.14, 0.1, 0.1, 0.08, 0.08, 0.06, 0.04, 0.02, and 0.02} corresponding to the data values is 0.9 or 90%, which meets the required density level percentage. The segment length for a second window is calculated the same way, but starting at the second data value point 75 on the x-axis 306. Thus, the second segment 325 includes data values from data value 75 to data value 143 because the sum of PDF Values: {0.16, 0.14, 0.1, 0.1, 0.08, 0.08, 0.06, 0.04, 0.02, 0.02, 0.06, and 0.04} is 0.9 or 90%, which is equivalent to the required density level percentage. The segment process is repeated until the last point in the threshold window (i.e., the last point in the x-axis 306) is identified as the beginning data point for a segment, which indicates that all of the data within the window has been consumed. The shortest data value segment having the highest concentration of data values in relation to the length of the data value interval range is identified as the MCI. Stated differently, from the set of identified segments, the segment with the minimum length (or the shortest length) is selected to represent the MCI. In the illustrated embodiment, the MCI of the data values of Example A is from 70 to 121 because segment 1 323 represents the shortest length of data values that contain the required percentage level.

The identified range of data (e.g., the MCI) may be used to generate an adaptive threshold for the one or more operational metrics and corresponding behavior data (operation 106). In particular, the server 202 generates the adaptive threshold by assigning an upper bound to the identified range of data and a lower bound to the identified range of data, effectively generating adaptive thresholds. Referring to Example A, the upper threshold is 121 and the lower threshold is 70, which are the upper and lower data values of the identified MCI. If the behavior of an operational metric falls below the lower bound, or if the behavior of the operational metric is above the upper bound, the behavior of the operational metric is out of the threshold range and may be considered an abnormality or violation (i.e., unacceptable).

In one embodiment, the upper and lower bounds of the adaptive threshold may be defined as a percentage, or probability that signifies a deviation from the adaptive threshold. To determine the probability that a point is above the upper threshold (Pu1), the server 202 may process the dataset of the threshold window and identify the number of data values that are above the upper threshold (Cu1). The probability Pu1 is computed by dividing Cu1 by the total number of points in the dataset of the threshold window. Referring to Example A, the number of data points above the upper threshold value of 121 is 5 (five) and includes the underlined data values, which are: {70, 75, 80, 70, 75, 80, 83, 86, 83, 86, 88, 130, 97, 108, 75, 80, 75, 88, 121, 143, 70, 75, 80, 70, 75, 80, 83, 86, 83, 86, 88, 130, 97, 108, 75, 80, 143, 108, 112, 115, 130, 70, 80, 86, 97, 112, 75, 83, 88, 97}. The probability is 5 divided by 50 (5/50), which is equivalent to 0.1 or 10% percent.

To determine the probability that a point is below a lower threshold (Pu2), the server 202 may process the dataset of the threshold window and identify the number of data values that are below the lower threshold (Cu2). The probability Pu2 is computed by dividing Cu2 by the total number of points in the dataset of the threshold window. Referring to Example A, the number of points below the threshold value of 70 is 0 (zero). Hence, the probability Pu2 is zero.

Referring back to FIG. 1, the generated adaptive thresholds are applied to the behavior data of the one or more operational metrics to determine whether one of the one or more operational metrics is signifying an abnormality or violation, which may include behaving above or below an accepted behavior, as indicated by the generated adaptive threshold(s) (operation 108). More specifically, to determine whether the behavior data corresponding to a particular operational metric is acceptable or an abnormality based on the adaptive threshold, behavior data corresponding to the operational metric and corresponding to a new window may be divided into one or more regions: a first region including the number of discrete data values above the upper bound of the adaptive threshold and, optionally, a second region including the number of discrete data values in the behavior data below the lower bound of the adaptive threshold. Any number of data values may be included within the first region or the second region, as long as the data is either above the upper bound, or below the lower bound, and there for signifying a potential abnormality or violation.

The identified regions of data (potentially signaling threshold violations) may be tested by computing p-values for each region using a binomial distribution cumulative density function, as is generally understood in the art. The p-values provide a confidence-level for the threshold violations, which are represented by the data values included within the first and/or second regions. Stated differently, since the data values included in the first region and/or the second region are either above the upper bound or below the lower bound of the adaptive threshold, the data values are considered to be per se, abnormalities, or violations. The p-values provide a statistical confidence that such abnormalities or violations should be treated as valid, instead of false positives.

In one particular embodiment, the p-values for a region may indicate that the data values within the region likely represent a different distribution than the first set of values and time window from which the adaptive threshold was originally generated. More specifically, the p-values may be used in a hypothesis testing statistical analysis to determine whether data values in the second dataset of a new window are from the same distribution of the data values of the first dataset of the threshold window. The null hypothesis is that the second dataset of the new window from the same distribution as the distribution of dataset of the threshold window. If the p-value is above the significance level (default 0.05), then the null hypothesis is accepted and the new dataset is considered to be from the same distribution as the distribution of the previous dataset, which indicates that the upper level system behavior has not changed. If the p-value is below the significance level (default 0.05), then the null hypothesis is rejected and the new dataset is considered to be from a different distribution as the distribution of the previous dataset, which indicates that the upper level system behavior has changed. The same null hypothesis used in determining the change in upper level system behavior is used to determine if the lower level system behavior has changed.

When the p-value is determined to be below a pre-defined confidence level an alarm may be generated. More specifically, the server 202 generates an alarm, which may be sent from the server 202 to a client device (e.g., an administrator user at a desktop computer) indicating the existence of abnormal behaviors of the one or more operational metrics currently monitoring the system. By only sending alarms when the p-value is below a certain confidence level, the sever 202 significantly reduces the probability of false positives in violations of the adaptive thresholds.

The applied adaptive threshold and the first and second region of data may be selected based on a single window, such as for example, the window 322 of FIG. 3B. Alternatively, the adaptive threshold and the region(s) of data may be selected from different sets of behavior data corresponding to different windows. For example and referring again to FIG. 3B, the adaptive threshold may be selected based on the window 322 and the regions of data may be selected based on the set of behavior data of the same window 322. Alternatively, the adaptive threshold may be selected or otherwise identified based on time window 326 and the regions of data may be selected or otherwise based on the set of behavior data of a different window, the window 330. In yet another example, the regions of data may be selected based on consecutive windows, such as for example, windows 322 and 324, and therefore, may involve overlapping sets of behavior data. In the case where the adaptive threshold is selected or otherwise identified based on a set of behavior data corresponding to a time window that is the same as the time window to which the regions of data correspond, the computed p-value for a region may provide an indication of the significance of the data values (i.e., discrete data values for an operational metric) included within a region (operation 110).

Once any regions have been identified from the data included within a given window (e.g., time window 322 or 328) and the data within the regions have been applied to one or more adaptive thresholds, the consumed behavior data is discarded, and new behavior data proportional to the amount of discarded data is added to the larger set of behavioral data corresponding to the operational metric, from which the range of data used to generate the applied adaptive threshold was originally identified. Thus, the thresholds are considered an "adaptive" threshold because the thresholds may be recomputed, or a new adaptive threshold may be generated, for a new window, as new behavior data corresponding to the relevant operational metrics becomes available. Referring to Example A, the threshold window dataset of fifty points includes { 70,75,80,70,75,80,83,86,83,86, 88, 130, 97, 108, 75, 80, 75, 88, 121, 143, 70, 75, 80, 70, 75, 80, 83, 86, 83, 86, 88, 130, 97, 108, 75, 80, 143, 108, 112, 115, 130, 70, 80, 86, 97, 112, 75, 83, 88, 97}. Assume a new window dataset of 10 points is {54, 61, 40, 45, 150, 68, 108, 49, 58, 36}. The number of data values in the new window is 10 (ten), so the left most 10 points in the threshold window is dropped (underlined) and the new window dataset is added, resulting in a revised threshold window of {88, 130, 97, 108, 75, 80, 75, 88, 121, 143, 70, 75, 80, 70, 75, 80, 83, 86, 83, 86, 88, 130, 97, 108, 75, 80, 143, 108, 112, 115, 130, 70, 80, 86, 97, 112, 75, 83, 88, 97, 54,61,40,45,150,68,108,49,58,36}. The upper and lower threshold are recomputed based on the new revised threshold window and the probabilities indicating whether a data value is outside of the threshold range are re-estimated based on the new revised threshold window. FIG. 3B provides an example illustration of the generation and/or recalculation of adaptive thresholds using a threshold window and a new window. Any window can be considered the initial threshold window, or alternatively, a new data window. For example, the threshold window used to generate and/or otherwise calculate the initial adaptive thresholds may be window 320 and the new window of behavior data may be window 322. As another example, the threshold window used to generate and/or otherwise calculate the initial adaptive thresholds may windows 322 and the new window of data may be window 326. In yet another example, the threshold window used to generate and/or otherwise calculate the initial adaptive thresholds may be window 324 and the new window of behavior data may be window 326.

Figure 4:
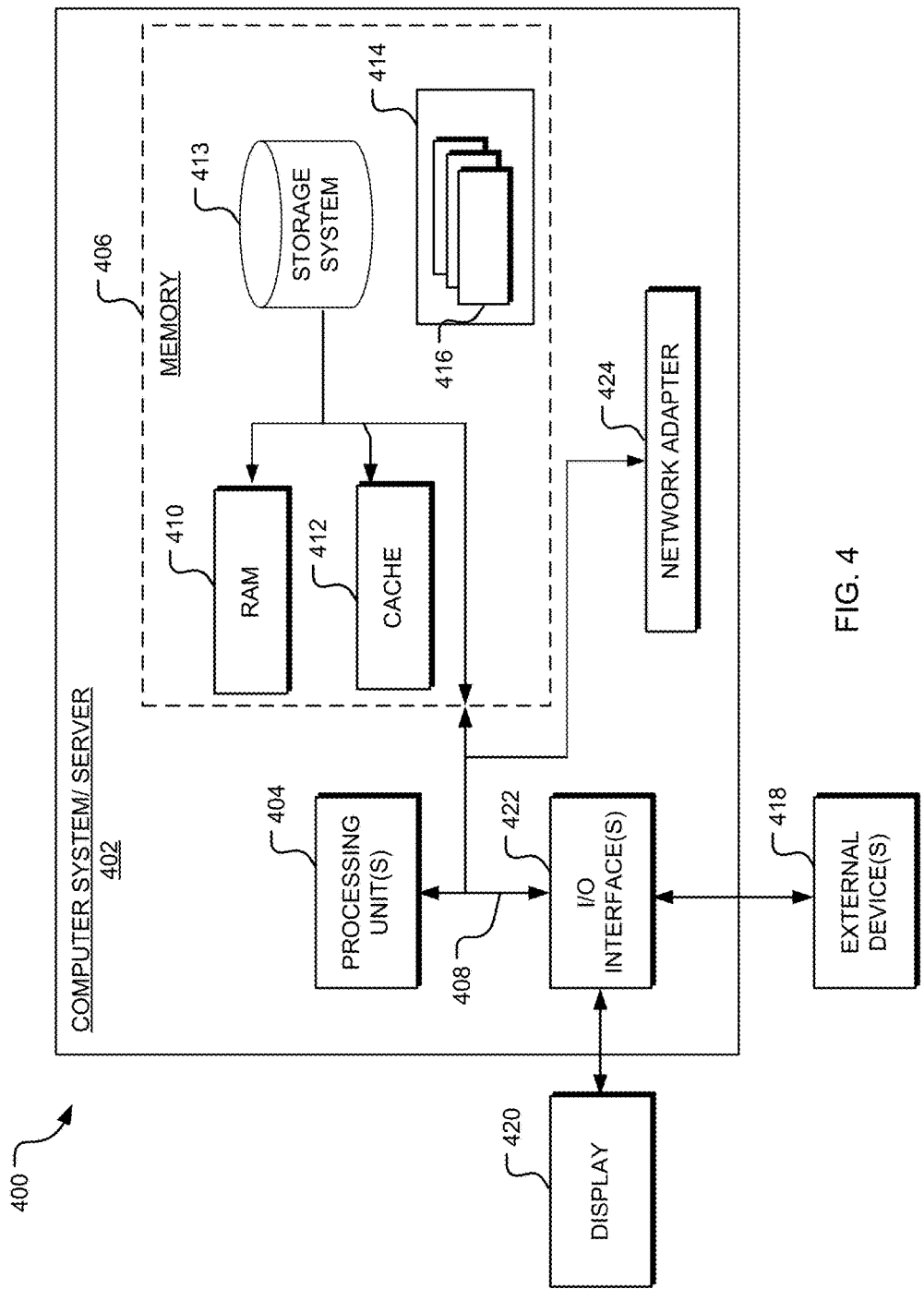
FIG. 4 is an illustration of a computing device, according to aspects of the present disclosure.

FIG. 4 illustrates an example of a computing node 400 which may comprise an implementation of the server 202. The computing node 400 represents one example of a suitable computing device and is not intended to suggest any limitation as to the scope of use or functionality of embodiments of the invention described herein. Regardless, the computing node 400 is capable of being implemented and/or performing any of the functionality described above.

As illustrated, the computer node 400 includes a computer system/server 402, which is operational with numerous other general purpose or special purpose computing system environments or configurations. Examples of well-known computing systems, environments, and/or configurations that may be suitable for use with computer system/server 402 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in computing node 400 is shown in the form of a general-purpose computing device. The components of computer system/server 402 may include one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 may include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 402; and/or any devices (e,g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method comprising:
for a first set of values that quantify behavior of a computing system, determining, by one or more computing devices, a value range that covers at least a certain percentage of all value occurrences in the first set but does not cover at least one or more value occurrences in the first set, wherein the value range is selected based at least in part on the value range having a shorter length than one or more other possible value ranges that also cover at least the certain percentage of all value occurrences in the first set;
determining, by the one or more computing devices, at least a first probability that the value occurrences in the first set are above or below the value range;
for a second set of values that quantify behavior of the computing system, determining, by the one or more computing devices, a number of values in the second set that are above or below the value range that was determined for the first set;
based at least in part on the number of values and at least the first probability, determining, by the one or more computing devices, whether the second set of values likely represents a different distribution than the first set of values; and
in response to determining that the second set of values likely represents a different distribution than the first set of values, sending, by the one or more computing devices to the computing system, an alarm that indicates that the behavior of the computing system quantified by the second set of values corresponds to a change in an operational state of the computing system from the behavior of the computing system quantified by the first set of values, wherein the alarm triggers one or more operations in the computing system to account for the change in the operational state of the computing system.

2. The method of claim 1, wherein the second set of values does not include a first subset of the first set of values but does include a second subset of the first set of values; and
wherein the second set of values further includes a third subset of values that replaces the first subset in a sliding window of a fixed number of values.

3. The method of claim 1, wherein the first set of values and the second set of values skip over sets of values that were collected between the first set and second set.

4. The method of claim 1, wherein the value range is a first value range, and wherein the number of values is a first number of values, further comprising:
for the second set of values, determining, by the one or more computing devices, a second value range that covers at least the certain percentage of all value occurrences in the second set but does not cover at least one or more value occurrences in the second set, wherein the second value range is selected based at least in part on the second value range having a shorter length than one or more other possible value ranges that also cover at least the certain percentage of all value occurrences in the second set;
determining, by the one or more computing devices, at least a second probability that the value occurrences in the second set are above or below the second value range;
for a third set of values that quantify behavior of the computing system, determining, by the one or more computing devices, a second number of values in the third set that are above or below the second value range that was determined for the second set;

based at least in part on the second number of values and at least the second probability, determining, by the one or more computing devices, whether the third set of values likely represents a different distribution than the second set of values; and in response to determining that the third set of values likely represents a different distribution than the second set of values, storing, by the one or more computing devices, an indication that the third set of values likely represents a different distribution than the second set of values.

5. The method of claim 1, wherein a length of the value range is a minimum possible length required to cover the certain percentage of all value occurrences.

6. The method of claim 1, wherein the first probability indicates a probability that the value occurrences are above the value range.

7. The method of claim 1, wherein the first probability indicates a probability that the value occurrences are below the value range.

8. The method of claim 1, wherein the first probability indicates a probability that the value occurrences are above and below the value range.

9. The method of claim 1, wherein determining whether the second set of values likely represents a different distribution than the first set of values comprises calculating a p-value based on the first probability and the number of values.

10. The method of claim 1, wherein the first set of values and the second set of values include measurements of response times of the computing system; wherein the alarm indicates that the computing system is taking more time to process requests than in a previous operational state.

11. The method of claim 1, wherein the first set of values and the second set of values include measurements of a throughput within the computing system; wherein the alarm indicates that the computing system is experiencing less throughput than in a previous operational state.

12. A non-transitory computer-readable medium encoded within instructions executable by a processor comprising:

for a first set of values that quantify behavior of a computing system, determining a value range that covers at least a certain percentage of all value occurrences in the first set but does not cover at least one or more value occurrences in the first set, wherein the value range is selected based at least in part on the value range having a shorter length than one or more other possible value ranges that also cover at least the certain percentage of all value occurrences in the first set;

determining at least a first probability that the value occurrences in the first set are above or below the value range;

for a second set of values that quantify behavior of the computing system, determining a number of values in the second set are above or below the value range that was determined for the first set;

based at least in part on the number of values and at least the first probability, determining whether the second set of values likely represents a different distribution than the first set of values; and in response to determining that the second set of values likely represents a different distribution than the first set of values, sending, to the computing system, an alarm that indicates that the behavior of the computing system quantified by the second set of values corresponds to a change in an operational state of the computing system from the behavior of the computing system quantified by the first set of values, wherein the alarm triggers one or more operations in the computing system to account for the change in the operational state of the computing system.

13. The non-transitory computer-readable medium of claim 12, wherein the second set of values does not include a first subset of the first set of values but does include a second subset of the first set of values; wherein the second set of values further includes a third subset of values that replaces the first subset in a sliding window of a fixed number of values.

14. The non-transitory computer-readable medium of claim 12, wherein the first set of values and the second set of values skip over sets of values that were collected between the first set and second set.

15. The non-transitory computer-readable medium of claim 12, wherein the value range is a first value range, and wherein the number of values is a first number of values, further comprising:

for the second set of values, determining, by the one or more computing devices, a second value range that covers at least the certain percentage of all value occurrences in the second set but does not cover at least one or more value occurrences in the second set, wherein the second value range is selected based at least in part on the second value range having a shorter length than one or more other possible value ranges that also cover at least the certain percentage of all value occurrences in the second set;

determining, by the one or more computing devices, at least a second probability that the value occurrences in the second set are above or below the second value range;

for a third set of values that quantify behavior of the computing system, determining, by the one or more computing devices, a second number of values in the third set that are above or below the second value range that was determined for the second set;

based at least in part on the second number of values and at least the second probability, determining, by the one or more computing devices, whether the third set of values likely represents a different distribution than the second set of values; and in response to determining that the third set of values likely represents a different distribution than the second set of values, storing, by the one or more computing devices, an indication that the third set of values likely represents a different distribution than the second set of values.

16. The non-transitory computer-readable medium of claim 12, wherein a length of the value range is a minimum possible length required to cover the certain percentage of all value occurrences.

17. The non-transitory computer-readable medium of claim 12, wherein the first probability indicates a probability that the value occurrences are above the value range.

18. The non-transitory computer-readable medium of claim 12, wherein the first probability indicates a probability that the value occurrences are below the value range.

19. The non-transitory computer-readable medium of claim 12, wherein the first probability indicates a probability that the value occurrences are above and below the value range.

20. The non-transitory computer-readable medium of claim 12, wherein determining whether the second set of values likely represents a different distribution than the first set of values comprises calculating a p-value based on the first probability and the number of values.

21. The non-transitory computer-readable medium of claim 12, wherein the first set of values and the second set of values include measurements of response times of the computing system; wherein the alarm indicates that the computing system is taking more time to process requests than in a previous operational state.

22. The non-transitory computer-readable medium of claim 12, wherein the first set of values and the second set of values include measurements of a throughput within the computing system; wherein the alarm indicates that the computing system is experiencing less throughput than in a previous operational state.

\* \* \* \* \*

UNITED STATES PATENT AND TRADEMARK OFFICE
CERTIFICATE OF CORRECTION

PATENT NO. : 10,069,900 B2
APPLICATION NO. : 14/452283
DATED : September 4, 2018
INVENTOR(S) : Poola et al.

Page 1 of 1

It is certified that error appears in the above-identified patent and that said Letters Patent is hereby corrected as shown below:

In the Specification

In Column 2, Line 16, delete "FIGS." and insert -- FIG. --, therefor.

In Column 4, Line 58, delete "j2ee" and insert -- J2EE --, therefor.

In Column 11, Line 19, delete "(e,g.," and insert -- (e.g., --, therefor.

Signed and Sealed this
Ninth Day of July, 2019

Andrei Iancu
*Director of the United States Patent and Trademark Office*